J. A. DENNIS & H. S. GILMAN.
IRRIGATING FURROW FORMING MACHINE.
APPLICATION FILED OCT. 13, 1914.
1,184,329.
Patented May 23, 1916.
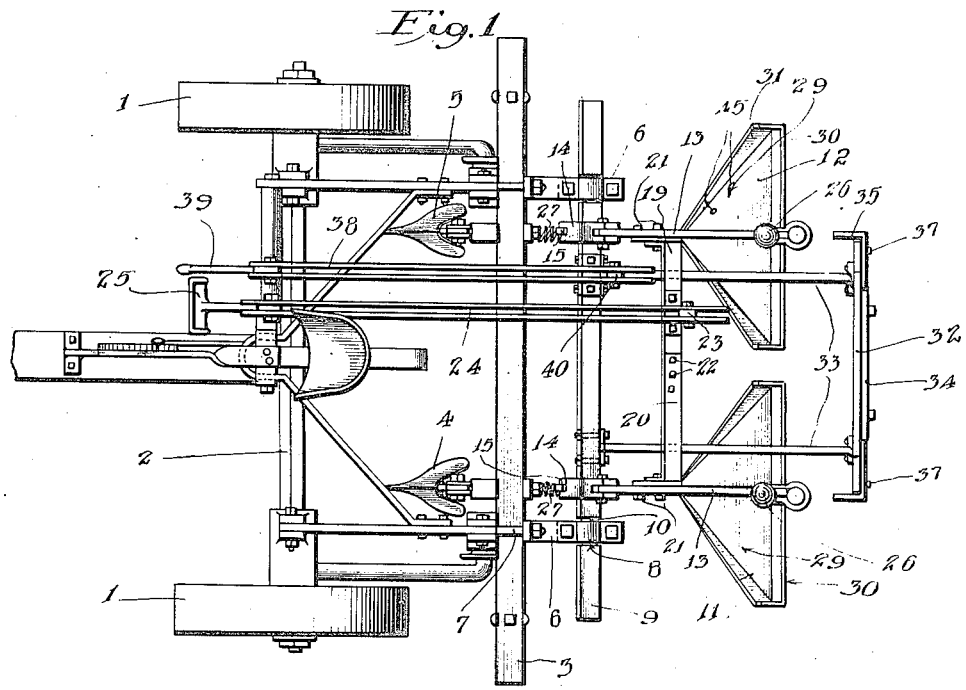
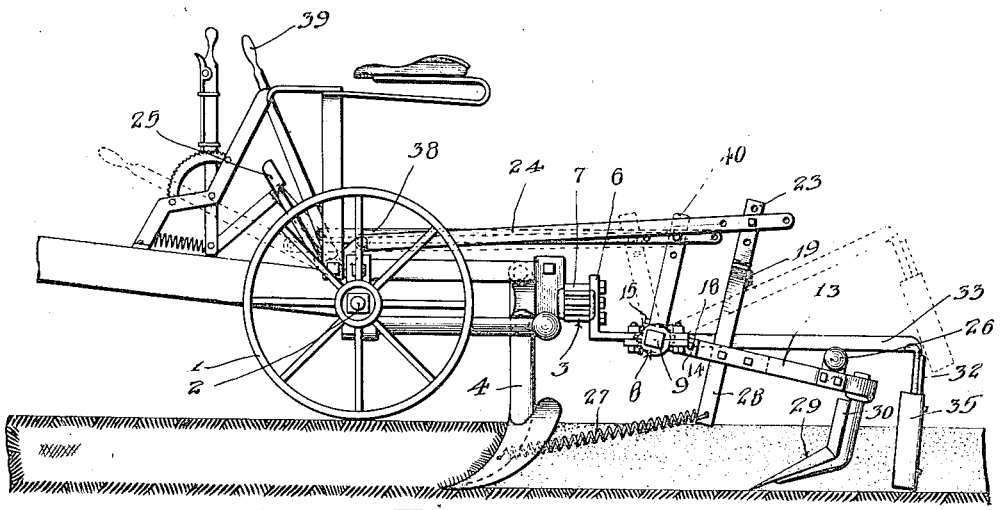

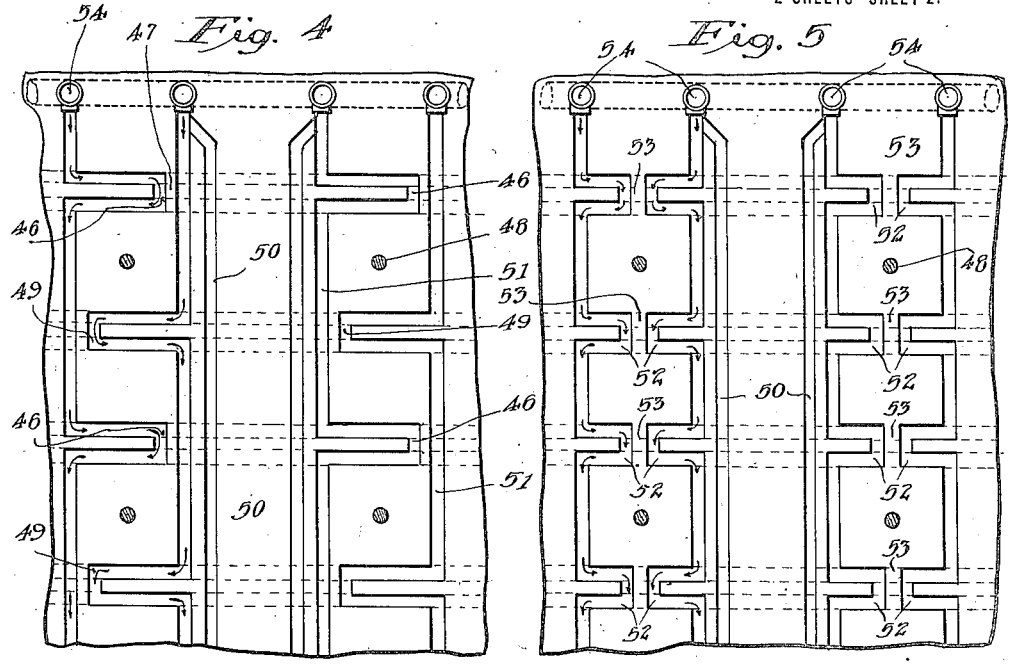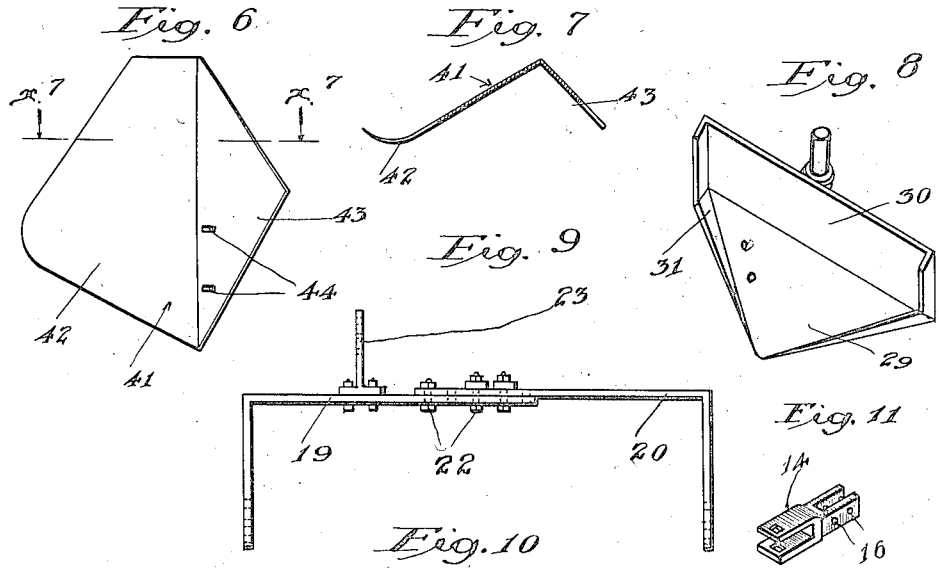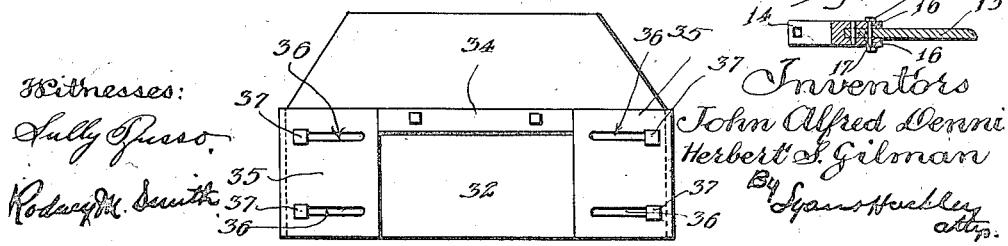

UNITED STATES PATENT OFFICE.

JOHN ALFRED DENNIS AND HERBERT S. GILMAN, OF SAN DIMAS, CALIFORNIA.

IRRIGATING-FURROW-FORMING MACHINE.

1,184,329.     Specification of Letters Patent.     Patented May 23, 1916.

Application filed October 13, 1914. Serial No. 866,445.

*To all whom it may concern:*

Be it known that we, JOHN ALFRED DENNIS and HERBERT S. GILMAN, citizens of the United States, residing at San Dimas, in the county of Los Angeles and State of California, have invented a new and useful Irrigating-Furrow-Forming Machine, of which the following is a specification.

The primary object of this invention is to provide an irrigating furrow forming machine, which will obviate the necessity of any hand shoveling, such as is now required to make the cross channels or furrows and dams.

Another object of the invention is to provide a machine or attachment of this nature which may be secured to an ordinary cultivator, so as to deepen and widen the furrows formed by small cultivator shovels, and also form the dams and cross channels necessary in irrigating.

Another object of the invention is to construct an irrigating furrow forming machine which may be successfully operated by one person, which is of extremely simple and practical construction, and which may be quickly assembled and arranged in different forms for the several operations necessary in preparing land for irrigation.

With these and other objects in view, the invention consists in certain novel features of construction, combination, and arrangement of parts, as will be hereinafter fully described, claimed and illustrated.

Figure 1 is a top plan view of the machine as it appears when attached to a cultivator. Fig. 2 is a side elevation of Fig. 1. Fig. 3 is a plan view of the supporting bar to be hereinafter described. Fig. 4 is a plan view showing one system of irrigating which may be carried out by the use of our machine. Fig. 5 is a plan view showing another system of irrigating furrows, which may be constructed by the use of this machine. Fig. 6 is an inside elevation of a wing attached to one of the shovels for straight furrowing. Fig. 7 is a section taken on the plane of line $x^7$—$x^7$, of Fig. 6. Fig. 8 is a perspective view of one of the shovels or furrow formers. Fig. 9 is a detail side elevation of the connecting frame for the two shovels. Fig. 10 is a rear elevation of the broad blade. Fig. 11 is a perspective view of one of the connecting members. Fig. 12 is a horizontal section through the connecting member shown in Fig. 11, and illustrating a connecting bar secured to the member.

Referring to the drawings in detail, 1 designates the wheels of a cultivator, 2 the axle, and 3 transverse frame bars spaced a slight distance apart to support the cultivator furrowing shovels 4 and 5 which dig the furrows. This cultivator is of the ordinary construction, and as it is not part of our invention proper, it will not be necessary to describe it in further detail.

In the present embodiment of the irrigating furrow forming machine, or attachment, a pair of brackets 6 are provided and secured to the frame bars 3 by suitable bolts 7. These brackets are of bar iron construction and support bearing pieces 8, forming in conjunction therewith, bearings for the supporting bar 9. As best shown in Fig. 3, this bar is rounded as indicated at 10, so as to revolve within the bearings.

A pair of furrow-finishing dam-forming shovels 11 and 12 which are constructed to collect and carry dirt during the operation of the machine are connected to the bar 9 by links 13 and attaching members 14 having U-shaped forward terminals which embrace the square bar 9 and which are rigidly secured thereto by wedge pins 15. The attaching members 14 are each provided with two pairs of holes 16 which register with openings 17 formed in the forward ends of the connecting bars or links 13. Pivot bolts 18 extending through the rear pairs of registering openings 16 and 17 connect the bars 13 to the coupling members 14 when the machine is forming the cross furrows. When longitudinal furrows are being formed intersecting the cross furrows, a bolt, not shown, is inserted through one pair of the forward openings 16 and 17 to rigidly connect one of the bars 13 to the corresponding connecting arm or coupling 14. An adjustable U-shaped frame consisting of the members 19 and 20, best shown in Figs. 1 and 9, is bolted to the bars 13, as indicated by the numerals 21, and the meeting ends of these members are connected by bolts 22. In order to raise and lower the furrow finishing dam-forming shovels 11 and 12, an inverted T 23 is bolted to the U-shaped frame, as shown in Fig. 9, and is connected by a pair of links 24 to a bell crank foot lever 25 carried by the cultivator. It will be seen that when this lever is pushed forwardly, that the links 24 will raise the U-shaped frame, swinging the shovels 11 and 12 upwardly about the pivot bolts 18. Weights 26 are provided to hold the rear shovels firmly in the furrows formed by the front shovels 4 and 5, and if desired, springs 27 may be provided in addition to the weights, said springs being connected at their forward ends to the shovels 4 and 5, and at their rear ends to brackets 28 bolted to the bars 13.

As shown in Fig. 1, the shovels 11 and 12 are considerably larger than the cultivator furrowing shovels so as to widen and deepen the furrows made by the latter. In Fig. 8 it will be seen that each of the rear shovels have downwardly and forwardly inclined surfaces 29 and a back wall or surface 30, which lies in an essentially vertical plane when the shovel is operative. A forwardly and upwardly extending flange 31 is formed on the side edge of the shovel so that dirt collected by the shovel will be carried thereby.

In addition to the parts heretofore described, we provide a broad channel-cutting dam-forming blade 32 which is rigidly connected by upwardly and forwardly extending arms 33 to the bar 9 and located rearwardly of but in close relation to the shovels 11 and 12 so as to eliminate as much as possible the falling of dirt into the finished furrows and to cause the broad blade to cooperate with the shovels 11 and 12 in depositing the dirt to form a dam. The forward ends of the arms 33 are rigidly and detachably bolted to the bar 9 so that the broad blade may be easily connected or detached, and said arms are of such a length as to permit the broad blade to be swung downwardly to the rear of the shovels 11 and 12. This broad blade carries a weight 34 and is also provided with extensions 35 connected by slots 36 and bolts 37 to the broad blade. To enable the broad blade to be raised and lowered independently of the shovels 11 and 12, we provide links 38 connected at their forward ends to a hand operated lever 39 and at their rear ends to an inverted T 40 bolted to the bar 9. When the lever is thrown forwardly the bar will be rotated in its bearings so as to raise the broad blade free of the ground. Any suitable means may be provided for holding the lever 39 and foot lever 25 in their operated positions so as to support the broad blade and shovels 11 and 12 from contact with the ground. The wing 41 having a forwardly extending portion 42 and a rearwardly extending portion 43, is secured to the shovel 12 at certain times as will be hereinafter explained, by suitable fasteners extended through the openings 44 of the wing and 45 of the shovel. The portion 43 of the wing engages the outer side of the shovel and the wing is so designed as to throw the dirt toward the machine.

The operation of our irrigating furrow forming machine may be best described by reference to Figs. 4 and 5, which show two different systems of irrigation commonly employed. In referring to these figures, the furrows which run across the paper will be termed the cross furrows, and those running lengthwise of the paper, the long or longitudinal furrows. The cross furrows are first formed and when doing so, the machine is assembled as shown in Figs. 1 and 2. When it is desired to form connecting channels 46, shown in Fig. 4, to join the furrows made by the shovels 4 and 5, and the furrow-finishing dam-forming shovels 11 and 12, the broad blade 32 is dropped by pulling back the hand lever 39 and is let drag to form a channel of the desired width. Then both the broad blade and shovels 11 and 12 are raised, dropping the earth which they have been pushing in front of them, the shovels 11 and 12 thus forming the dams 47. When the shovels and blades are raised simultaneously after being dragged, the dirt which has been pushed ahead by the blade combines with the dirt deposited by the shovels and a strong thick and high dam is formed. The shovels 11 and 12 are dropped again when the dams have been formed, but the broad blade is held in elevated position until the next row of trees 48 have been reached, when another cross channel is formed, as previously described. When the edge of the orchard has been reached, the machine is turned and driven back across the field on the opposite side of the row of trees to form the cross furrows and the connecting channels 49 and dams 47. When the orchard has been gone over once in this manner, the longitudinal furrows are formed, and to do this properly, the plow or shovel 5 is disconnected from the cultivator; the wing 41 connected to the shovel 12 and said furrower rigidly connected to the bar 9 by inserting a bolt through the front pair of openings 16 and 17 in the arm 13 and coupling 14 respectively. The broad blade is next disconnected from the bar 9, and when a shovel that will throw the dirt toward the machine is connected in place of the shovel 5 which was removed, the machine is ready to form the longitudinal channels. The members 19, 20 and 24 may also be removed if so desired. In doing so, it is driven so as to position the shovel, last mentioned, and shovel 12 next to the adjacent row of trees. The shovel 4 and shovel 11 form the unbroken channels 50 and the shovel 12 is raised when passing by the strips of land between the cross furrows, and since this shovel with its wing attachment throws the dirt toward the machine, a continuous channel 51 is formed.

In laying out a field or orchard in accordance with the system shown in Fig. 5, the machine is first used in its assembled position, as shown in Figs. 1 and 2, and the operation is similar to that described for the system shown in Fig. 4, with the exception of the method used in forming the connecting channels 52. To form the first channel the broad blade 32 is dropped momentarily, and then raised simultaneously with the shovels 11 and 12. During these operations the machine continues in motion and when the broad blade and shovels are clear of the ground the dirt collected by the shovels 11 and 12 and broad blade has dropped and the dams 53 are formed. After the formation of the dams, the broad blade and shovels are simultaneously dropped to form the next connecting channel 52, and then the broad blade is raised leaving the shovels 11 and 12 in contact with the ground. The furrow-finishing dam-forming shovels and broad channel-cutting dam-forming blade which is located in the rear of the shovels but in close relation to the shovels coöperate when raised simultaneously to form a dam in that the dirt carried by them is deposited in the finished furrows and a relatively high dam is formed. Owing to the shape of the shovels 11 and 12, when the dirt is deposited, it is thrown well over the outer sides of the furrowers so as to form a strong high dam.

It will be seen that our machine does away almost entirely with any hand furrowing, and that the water coming from the stand pipes 54 flows through unbroken channels across the field.

From the foregoing description taken in connection with the accompanying drawing, it will be seen that we have provided a very simple and practical irrigating furrow forming machine or attachment which is capable of being easily assembled and disassembled to properly form the water courses, and which may be operated by a single person.

It will be understood that while we have shown and described the preferred embodiment of our invention, that we do not wish to be limited to this exact construction, but may make such changes as may suggest themselves from time to time, provided they fall within the scope and spirit of the invention as claimed.

What we claim is:

1. In an attachment of the character described, a transverse horizontal rotatable bar, a pair of attaching members secured to said bar, rearwardly extending arms, means to rigidly connect the arms to the attaching member, means for pivotally connecting the arms to the attaching member when the first means is not used, means for rotating said bar to raise the arms when rigidly secured to the attaching members, additional means for raising the arms when pivotally secured to the attaching members, and a furrower connected to the rear end of each of said arms.

2. In a machine of the character described, a horizontal bar rotatably supported, a pair of rearwardly extending arms detachably connected to said bar to move therewith, means to pivotally connect the arms to the bar, and a furrower connected to the rear end of each of said arms.

3. In an irrigating furrow forming machine, the combination with a frame and furrowing shovels on the frame, of furrow-enlarging dam-forming shovels carried by the frame rearwardly of and in line with the furrowing shovels, said furrow-enlarging dam-forming shovels being wider than the furrowing shovels, dirt retaining means carried by the furrow-enlarging dam-forming shovels, and means to raise said last named shovels to cause them to deposit dirt carried thereby and form dams in the furrows.

4. In an irrigating furrow forming machine, the combination with a frame and furrowing shovels on the frame, of furrow-enlarging dam-forming shovels carried by the frame rearwardly of and in line with the furrowing shovels, said furrow-enlarging dam-forming shovels being wider than the furrowing shovels, dirt-retaining means carried by the furrow-enlarging dam-forming shovels, means to raise said last named shovels to cause them to deposit dirt carried thereby and form dams in the furrows, a wide channel-cutting dam-forming blade located rearwardly of and in close relation to the furrow-widening dam-forming shovels and having its ends disposed in line with the furrowing shovels, and means to raise said blade whereby the dirt pushed forward thereby will combine with the dirt deposited by the furrow-widening dam-forming shovels and strengthen the dams formed by the shovels.

5. In an irrigating furrow forming machine the combination with a frame having furrowing shovels thereon, of furrow-widening dam-forming shovels carried by the frame rearwardly of and in line with the shovels, said last named shovels being wider than the first named shovels, dirt retaining flanges carried on the sides of said last named shovels, means for vertically adjusting said furrow-widening dam-forming shovels, and a vertically adjustable channel-cutting dam-forming blade located rearwardly of the furrow-widening dam-forming shovels and having its ends substantially in line with the furrowing shovels.

6. In an irrigating furrow forming machine, the combination with a frame having furrowing shovels thereon, of furrow-widening dam-forming shovels carried by the frame rearwardly of and in line with the shovels, said last named shovels being wider than the first named shovels, dirt retaining flanges carried on the sides of said last named shovels, means for vertically adjusting said furrow-widening dam-forming shovels, a vertically adjustable channel-cutting dam-forming blade located rearwardly of the furrow-widening dam-forming shovels and having its ends substantially in line with the furrowing shovels, and means for simultaneously raising the adjustable shovels and the blade.

7. In an irrigating furrow forming machine, the combination with a frame having furrowing shovels thereon, of furrow-widening dirt-carrying shovels located rearwardly of and in line with the furrowing shovels, and means to vertically adjust the last named shovels.

In testimony whereof, we have hereunto set our hands at San Dimas, California, this 5th day of October, 1914.

JOHN ALFRED DENNIS.
  HERBERT S. GILMAN.

In presence of—
 NELL F. MIZE,
 G. CYRIL PLATT.